United States Patent [19]

Swier

[11] Patent Number: 5,692,392
[45] Date of Patent: Dec. 2, 1997

[54] SOFT FROZEN BEVERAGE DISPENSER APPARATUS AND METHOD

[76] Inventor: Raymond R. Swier, 104 Camphorwood Ct., Winter Springs, Fla. 32809

[21] Appl. No.: 702,979

[22] Filed: Aug. 26, 1996

[51] Int. Cl.$^6$ ............................................ A23G 9/12
[52] U.S. Cl. .................................. 62/342; 222/146.6
[58] Field of Search ........................ 62/342, 68, 392, 62/394, 395; 222/146.6

[56] References Cited

U.S. PATENT DOCUMENTS

| | | | |
|---|---|---|---|
| 2,745,261 | 5/1956 | Merrill | 62/114 |
| 2,778,202 | 1/1957 | Fischer et al. | 62/114 |
| 2,784,565 | 3/1957 | Stalkup | 62/114 |
| 3,045,441 | 7/1962 | Patch et al. | 62/68 |
| 3,056,273 | 10/1962 | Cornelius | 62/393 |
| 3,069,871 | 12/1962 | Johnson | 62/390 |
| 3,180,110 | 4/1965 | Dunn | 62/343 |
| 3,196,627 | 7/1965 | Swenson | 62/342 |
| 3,230,735 | 1/1966 | Nelson | 62/309 |
| 3,319,436 | 5/1967 | Wilch | 62/68 |
| 3,400,551 | 9/1968 | Booth et al. | 62/135 |
| 3,656,316 | 4/1972 | Stock | 62/306 |
| 3,811,494 | 5/1974 | Menzel | 62/342 |
| 3,958,428 | 5/1976 | Kelso | 62/69 |
| 4,083,200 | 4/1978 | Luxem | 62/342 |
| 4,476,146 | 10/1984 | Manfroni | 62/342 |
| 4,680,944 | 7/1987 | Menzel | 62/342 |
| 4,696,417 | 9/1987 | Ugolini | 222/146.6 |
| 4,817,396 | 4/1989 | Menzel | 62/342 |
| 5,201,861 | 4/1993 | Menzel | 62/342 |
| 5,230,448 | 7/1993 | Strohmeyer et al. | 222/146.6 |
| 5,463,878 | 11/1995 | Parekh et al. | 62/394 |
| 5,473,909 | 12/1995 | Kateman et al. | 62/306 |

*Primary Examiner*—William E. Tapolcai
*Attorney, Agent, or Firm*—William M. Hobby, III

[57] ABSTRACT

A portable soft frozen beverage dispenser apparatus has a housing supported on wheels and having a refrigerated storage tank for the storage of a soft frozen beverage therein and having a motor driven rotating mixing blade within the tank. A refrigerated dispenser storage tank is used for further storage and dispensing of the soft frozen beverage and also has a rotating mixing blade therein. Tubing connects the refrigerated storage tank with the dispenser storage tank through a motor driven pump which pumps the soft frozen beverage from the storage tank to the dispenser storage tank while a second tubing recirculates the soft frozen beverage from the dispenser storage tank back to the refrigerated storage tank. A nozzle in the dispenser storage tank dispenses the soft frozen beverage so that a stored soft frozen beverage can be rapidly dispensed from a wheeled storage vehicle. The method includes selecting the apparatus for a portable soft frozen beverage dispenser, filling the refrigerated storage tank with a soft frozen beverage and pumps the soft frozen beverage to the dispenser storage tank where the soft frozen beverage is dispensed and recirculates the soft frozen beverage whenever the pump is operating.

6 Claims, 2 Drawing Sheets

SOFT FROZEN BEVERAGE DISPENSER APPARATUS AND METHOD

BACKGROUND OF THE INVENTION

The present invention relates to a portable soft frozen beverage dispenser and to a method of storing and dispensing a soft frozen beverage and especially to the storage and dispensing of a soft frozen beverage from a wheeled cart.

Partially frozen or slush beverages have become popular in the United States especially in the summer months of the year and are widely dispensed at theme and entertainment parks and outdoor fairs and the like. In addition, such beverages have been sold at driven-in restaurants, roadstands and within shopping malls. The beverages may be fruit flavored and are either carbonated or non-carbonated partially frozen drinks. It has been common in the past to mix a fruit flavored non-carbonated drink in a pail and freezing to a predetermined temperature which is not solidly frozen and then mixing the ice crystals and liquid for dispensing the thick slush. It has also been suggested to dispense various types of flavors or beverages having frozen and non-frozen components and having a dispenser which may include a refrigeration machine and motor driven agitators for stirring the mixed frozen and unfrozen components of a beverage. A valve or tap is used to dispense individual portions or servings of the semi-frozen beverage for sale to a consumer. The making and dispensing of semi-frozen beverages sometimes includes placing the system for making the beverages on a wheeled cart for moving to different locations where the cart can be connected to a power source and run for a sufficient length of time to generate the necessary ice crystals.

Systems have also been suggested for making carbonated beverages which are maintained in tanks at pressures above atmospheric pressure and at temperatures such that the carbonated beverage is not frozen. When the beverage is suddenly discharged into an area of atmospheric pressure, a slushy beverage results from the expansion of the gas contained therein. One of the main problems with prior art dispensers has been the time required to make and dispense the soft frozen beverage in order to meet a big demand for the beverage. Prior art machines have been satisfactory for making and dispensing the beverages until a large demand is made upon the person operating the machine for a large number of consumers.

The present invention is directed towards a portable soft frozen beverage dispenser which stores a premixed and formulated soft frozen beverage in a refrigerated storage tank and in a separate dispenser storage tank and in which the tanks are interconnected with a pump for pumping the soft frozen beverage from one to the other and which has a recirculation line for continuously recirculating the soft frozen beverage whenever the pump is operated. The soft frozen product is dispensed by opening a valve where the soft frozen beverage is dispensed under the constant pressure of the pump pumping the soft frozen beverage from the refrigerated stored tank to the refrigerated dispenser tank. The present portable soft frozen dispensers are especially suitable for wheeled carts located in theme parks or the like where large demands for dispensing of the soft frozen beverage can be made upon the operator and where a soft frozen beverage can be preformulated at a central location for filling each of the dispenser carts.

A prior art slush beverage machine can be seen in the Booth et al. U.S. Pat. No. 3,400,551, for an apparatus for producing slush beverages in which the liquid is maintained under carbonation gas pressure during transfer of energy thereto from a small heat pump to form and maintain the slush tank. In the Fischer et al. U.S. Pat. No. 2,778,202, is for a dispenser for semi-frozen beverages and an agitator therefor for producing and dispensing semi-frozen beverages, such as milk shakes, ices, partially frozen custards, and the like where the beverage is comprised of both liquid and frozen parts. This patent is directed mainly towards a beverage agitating and stirring mechanism for the semi-frozen beverage dispensers. The Dunn U.S. Pat. No. 3,180,110, is a slush ice beverage maker for making a partially frozen non-carbonated beverage and in which the dispenser is free of internal clogging of the feed with the ice crystals.

The Ugolini U.S. Pat. No. 4,696,417, is a refrigerated beverage dispenser and whipper device while the Kelso U.S. Pat. No. 3,958,428, is a method and apparatus for making frozen food articles in which the food article is maintained in a ready state for freezing without having the freezing chamber at a reduced temperature. The Luxem U.S. Pat. No. 4,083,200, is a slush freezing apparatus with an upper liquid reservoir having a rotary agitator above the divider plate between the upper liquid reservoir and the lower freezing chamber. The Parekh et al. U.S. Pat. No. 5,463,878, is a chilled product dispensing apparatus for serving soft serve food products, such as ice creams, frozen yogurts, custards, and the like. The Wilch U.S. Pat. No. 3,319,436, is an ice slush dispenser for producing a slush of a liquid containing frozen particles. The Kateman et al. U.S. Pat. No. 5,473,909, is a method and apparatus for producing and dispensing aerated and blended fluid products which may be cooled to a solid or semi-solid state.

The Stock U.S. Pat. No. 3,656,316, is a cream cocktail dispenser for dispensing frozen cream cocktails and includes a remote mixing and storage chamber which contains a quantity of custard cream and liquor in preselected proportions and an agitator for continuously mixing the ingredients which are conveyed by air pressure to a freezing chamber upon actuation of a dispensing valve. The Cornelius U.S. Pat. No. 3,056,273, is a beverage dispenser in which a beverage in a large receptacle is cooled and dispensed. The Merrill U.S. Pat. No. 2,745,261, is an apparatus for the continuously freezing of ice cream, ice milk, sherbets, ices, and related products and has means for injecting fruits, nuts, flavoring, and color into the freezer so as to be properly mixed and frozen before the ice cream is drawn from the freezer. The Johnson U.S. Pat. No. 3,069,871, is a drink dispenser for dispensing refrigerated liquids. The Stalkup U.S. Pat. No. 2,784,565, is a continuous flow attachment for soft ice cream freezers. The Nelson U.S. Pat. No. 3,230,735, is a faucet cooler in a pre-mix machine for cooling a material to be dispensed from a faucet.

In contrast to the prior art, the present invention is directed to the rapid dispensing of stored premixed soft frozen beverages which soft frozen beverages can be rapidly loaded onto a portable refrigerated cart.

SUMMARY OF THE INVENTION

A portable soft frozen beverage dispenser apparatus has a housing supported on wheels and having a refrigerated storage tank for the storage of a soft frozen beverage therein and having a motor driven rotating mixing blade within the tank. A refrigerated dispenser storage tank is used for further storage and dispensing of the soft frozen beverage and also has a rotating mixing blade therein. Tubing connects the refrigerated storage tank with the dispenser storage tank through a motor driven pump which pumps the soft frozen beverage from the storage tank to the dispenser storage tank while a second tubing recirculates the soft frozen beverage from the dispenser storage tank back to the refrigerated storage tank. A nozzle in the dispenser storage tank dispenses the soft frozen beverage so that a stored soft frozen beverage can be rapidly dispensed from a wheeled storage vehicle. The method includes selecting the apparatus for a portable soft frozen beverage dispenser, filling the refrigerated storage tank with a soft frozen beverage and pumps the soft frozen beverage to the dispenser storage tank where the soft frozen beverage is dispensed and recirculates the soft frozen beverage whenever the pump is operating.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
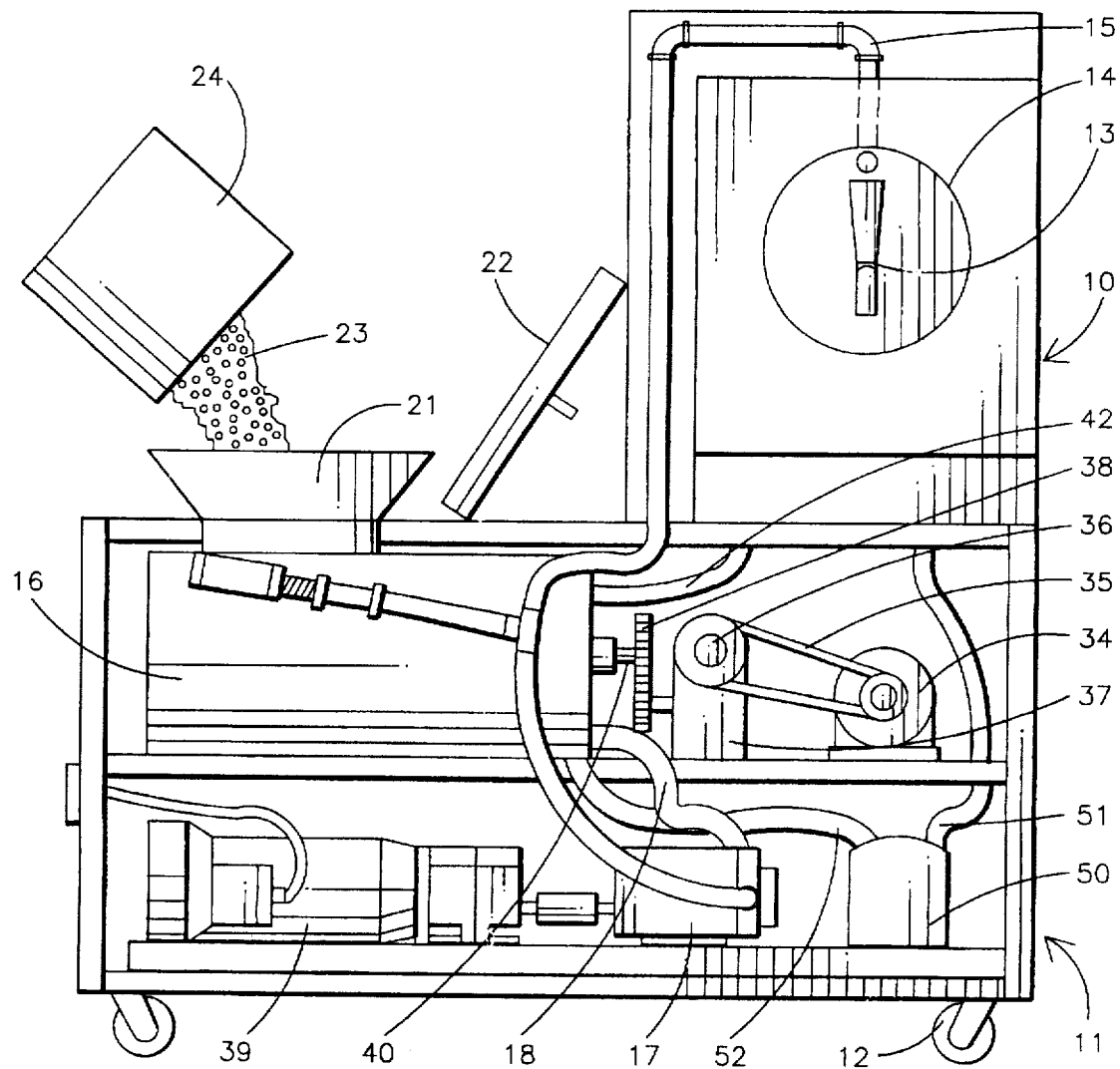
FIG. 1 is a sectional view of a wheeled cart soft frozen beverage dispenser in accordance with the present invention.
Figure 3:
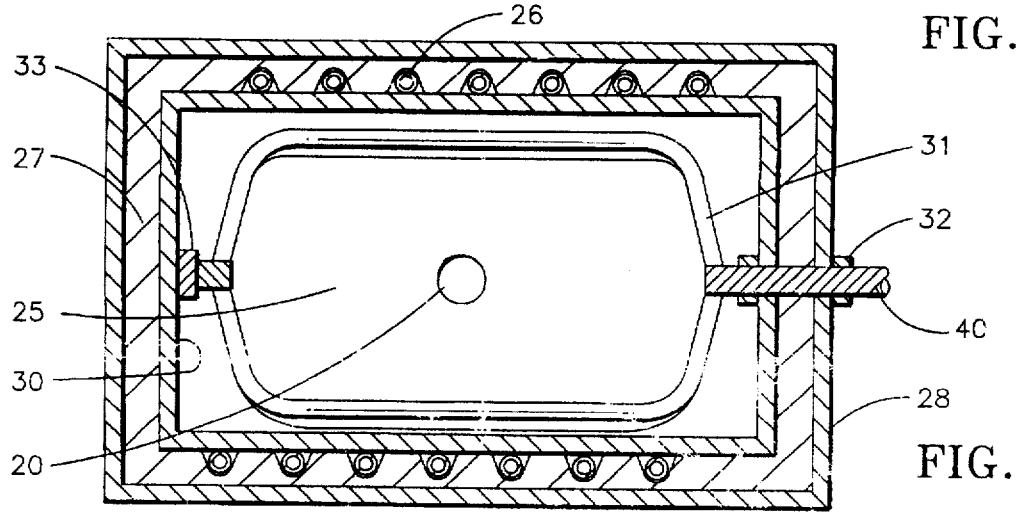
FIG. 3 is a sectional view taken through the refrigerated storage tank of the soft frozen beverage storage and dispenser of FIGS. 1 and 2.
Figure 2:
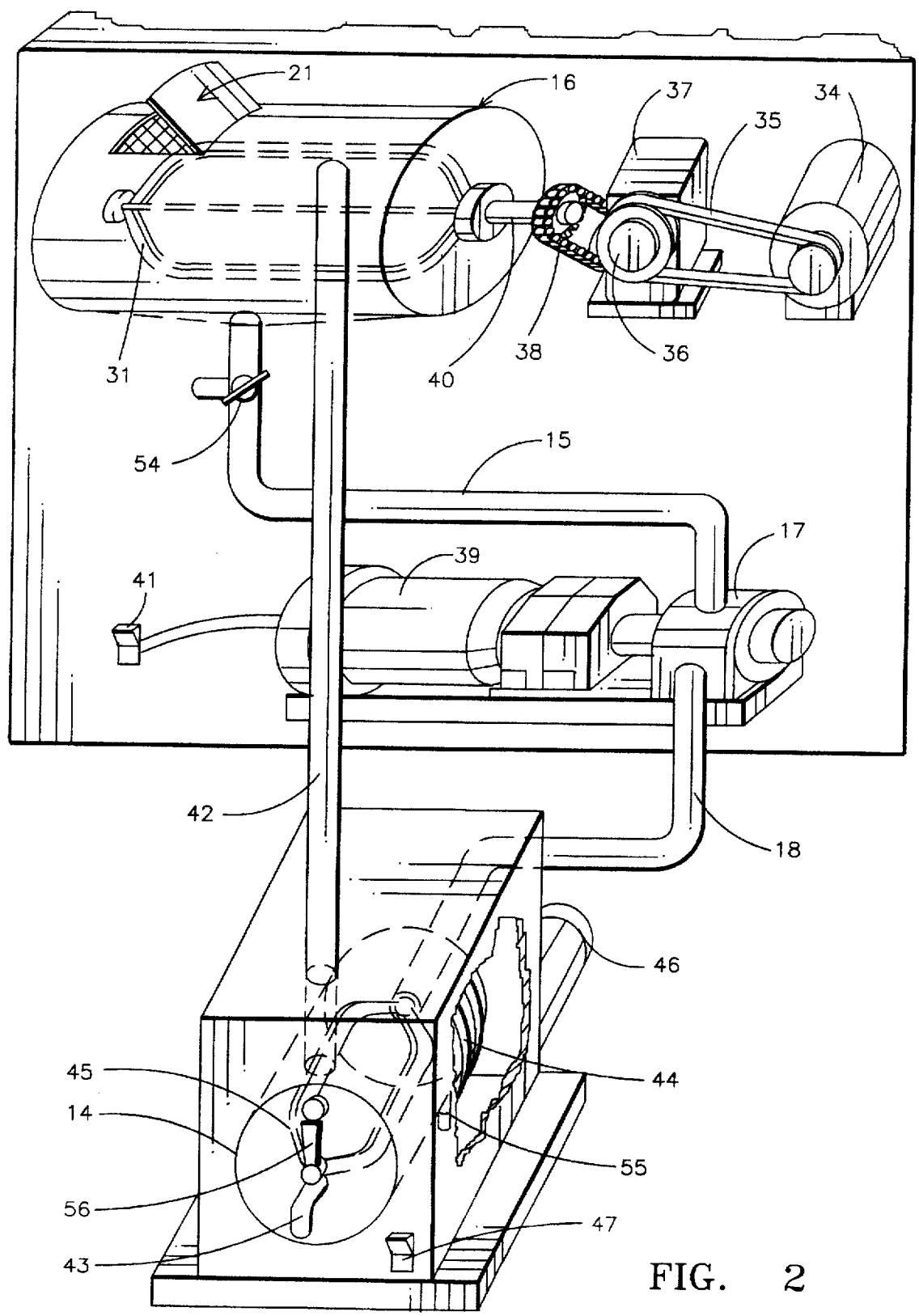
FIG. 2 is a diagrammatic view of the soft frozen beverage dispenser of FIG. 1.

Referring to the drawings and especially to FIGS. 1 through 3, a soft frozen beverage dispensing cart 10 has a housing 11 supported on wheels 12. The housing 11 has a dispensing nozzle 13 for dispensing a soft frozen beverage therefrom which is a partially frozen drink and dispenses from a dispenser storage container 14 which is continuously fed by a pipe or tubing 15 from a storage container 16. The pipe 15 passes through a pump 17 and continues with the tubing 18 connected to an exit 20 in the storage tank 16. The storage tank 16 has an opening 21 formed in the shape of a hopper which has a closeable top 22 fitting thereover and which may be loaded with a premixed soft frozen type beverage, such as a fruit flavored soft frozen product 23, loaded from a pail 24. The soft frozen beverage 23 enters the tank 16 chamber 25 which has refrigeration coils 26 therearound mounted with an insulation 27 inside an outer container wall 28 and interior container walls 30. A rotating paddle mixer 31 is mounted within the chamber 25 and supported on bearings or sleeves 32 and 33. The soft frozen product is continuously mixed by the rotation of the mixing blade 31 which is driven by a motor 34 driving a belt 35, and a pulley 36 operating a gear reduction gear box 37 drives a chain 38 to rotate the shaft 40 of the paddle blade 31. The stored and refrigerated soft frozen beverage in the chamber 25 is drawn through the exit opening 20, through the tubing 15 and into the storage container 14 by the pump 17. Pump 17 is actuated by an electric motor 40 which is actuated by a switch 41 mounted on the exterior of the housing 11.

Operation of the motor 40 and the pump 17 draws soft frozen product through the tubing 15 and through the tubing 18 and into the chamber of the dispenser tank 14. A recycle tubing 42 is also connected from the tank 14 to the refrigerated storage tank 16 so that operation of the pump 17 continuously draws the soft frozen beverage from the storage tank 16 through the storage tank 14 and through the recycling tubing 42 to the storage tank 16. The soft frozen beverage in the tank 14 is thus under continuous pressure so that opening of the valve 43 allows the dispensing, under the pressure from the pump 17, of the soft frozen beverage. The storage tank 14 is wrapped in refrigeration coils 44 to continuously refrigerate the tank 14 and has a rotating paddle mixer 45 which is driven by an electric motor 46 which may be operated by an electric switch 47 mounted on the front of the housing. The refrigeration generated in the coils 26 and 44 is through a condenser or compressor unit 50 which provides the refrigerant through a refrigerant line 51 to the coils 44 through the refrigerant line 52 to the coils 26 for continuously refrigerating the containers 16 and 14. A drainage valve 54 is provided in the tubing 15 directly beneath the tank 16 for draining the tank 16 during the cleaning of the tank and system. In addition, a cleaning drain 55 is provided from the tank 14.

In operation, the cart 10 can be filled with a soft frozen beverage 23 from a central location simply by pouring the soft frozen beverage into the hopper 21 and into the storage tank 16. Once the compressor 50 is turned on, the storage tank 16 and the tank 14 will be continuously refrigerated. In addition, the mixing paddles 31 in the tank 16 and 45 in the tank 14 are continuously operated to slowly mix the soft frozen beverage. When the pump 17 is actuated, it will continuously pump the soft frozen beverage from the tank 16 through the tubing 16 and 18 and into the dispenser tank 14 which, once filled, will recirculate the soft frozen beverage through the tubing 42 back to the tank 16 while maintaining a constant pressure of soft frozen beverage within the tank 14. Opening the dispenser nozzle 14 with the handle 56, dispenses the soft frozen beverage under the pressure in the tank 14 from the pump 17. The beverage is continuously mixed with the rotating mixer paddle 45 and rapidly dispenses the storage soft frozen beverage.

It should be clear at this time that a present soft frozen beverage dispenser and wheeled cart has been provided which allows for the rapid and continuous dispensing of a soft frozen beverage stored within a refrigerated storage tank and within a refrigerated dispenser tank. However, it should also be clear that the present invention is not to be construed as limited to the forms shown which are to be considered illustrative rather than restrictive.

I claim:

1. A portable soft frozen beverage dispenser comprising:

a housing supported on wheels;

a refrigerated storage tank having a covered opening for loading a soft frozen beverage thereinto and having a motor driven rotating mixing blade therein and an exit therefrom;

a refrigerated dispenser storage tank for dispensing a soft frozen beverage stored therein, said dispenser storage tank having a rotating mixing blade therein and a drain therefrom;

first tubing connected between said refrigerated storage tank and said dispenser storage tank said first tubing having a refrigerated storage tank drain connected thereto for draining said refrigerated storage tank;

a motor driven pump connected in said first tubing for pumping the soft frozen beverage stored in said refrigerated storage tank to said dispenser storage tank responsive to the actuation of said pump;

second tubing connecting said dispenser storage tank to said refrigerated storage tank for the recirculation of pumped soft frozen beverage; and a refrigeration compressor being mounted in said housing and operatively connected to said refrigerated storage tank and to said dispenser storage tank; whereby a stored soft frozen beverage can be rapidly dispensed from a wheeled beverage dispenser.

2. A portable soft frozen beverage dispenser in accordance with claim 1 in which said dispenser storage tank rotating mixing blade is a motor driven paddle wheel.

3. A portable soft frozen beverage dispenser in accordance with claim 2 in which said refrigerated storage tank covered opening is a covered hopper for loading a soft frozen beverage therethrough.

4. A portable soft frozen beverage dispenser in accordance with claim 3 in which said dispenser storage tank has dispenser nozzle for dispensing a soft frozen beverage from said tank responsive to said motor driven pump pressure when said nozzle is opened.

5. A portable soft frozen beverage dispenser in accordance with claim 4 in which said soft frozen beverage storage tank motor driven mixing blade is coupled to mixing blade through reduction gear box.

6. A portable soft frozen beverage dispenser in accordance with claim 5 in which said motor driven pump is actuated by switch positioned on said housing.

* * * * *